United States Patent [19]

Ottenheimer

[11] Patent Number: 4,653,323

[45] Date of Patent: Mar. 31, 1987

[54] APPARATUS FOR MOVING AN OBJECT IN AN ISOLATED ENVIRONMENT

[75] Inventor: Fritz Ottenheimer, Forest Hills, Pa.

[73] Assignee: Westinghouse Electric Corp., Pittsburgh, Pa.

[21] Appl. No.: 785,807

[22] Filed: Oct. 9, 1985

[51] Int. Cl.⁴ .................. G01F 15/00; G21C 17/00
[52] U.S. Cl. ........................ 73/866.4; 376/202; 376/245; 376/260; 165/11.1; 73/86; 366/117; 366/241; 374/52; 374/57; 374/134
[58] Field of Search ............... 376/260, 251, 252, 245, 376/202; 73/432 SD, 663, 86; 366/142, 118, 117, 241; 374/52, 134, 57, 43, 45; 165/11.1

[56] References Cited

U.S. PATENT DOCUMENTS

| | | | |
|---|---|---|---|
| 2,478,207 | 8/1949 | Robinson | 366/118 |
| 2,670,624 | 3/1954 | Faris, Jr. et al. | 374/52 |
| 3,015,947 | 1/1962 | Kadel | 374/52 |
| 3,106,092 | 10/1963 | Shapiro | 165/11.1 |
| 3,294,642 | 12/1966 | Recule et al. | 376/202 |
| 3,710,964 | 1/1973 | Douglass, Jr. | 366/117 |
| 4,172,993 | 10/1979 | Leach | 374/45 |
| 4,425,810 | 1/1984 | Simon et al. | 374/45 |
| 4,523,466 | 6/1985 | Lubin et al. | 376/245 |

Primary Examiner—Deborah L. Kyle
Assistant Examiner—Dan Wasil
Attorney, Agent, or Firm—Daniel C. Abeles

[57] ABSTRACT

An apparatus for moving an object in an isolated environment may be employed as a high pressure and temperature facility for testing steam generator tubes. A tube to be tested extends through an opening in a plate that is mounted in a test vessel. The vessel is partially filled with water having selected contaminants, and heated water under high pressure is circulated through the tube to raise the temperature and pressure within the vessel. A lever arm having an inner end and an outer end extends through an opening in the test vessel. A vibration-coupler connects the inner end of the arm to the tube under test, and a fulcrum-former operationally connects an intermediate portion of the arm to the test vessel. The outer end of the lever arm is connected to a plug element which is shaken, so that the arm pivots about a fixed point at the fulcrum-former and the vibration-coupler moves the tube under test with respect to the plate. A flex tube surrounding the outer portion of the lever arm is sealed to the plug element and to the test vessel to provide a pressure boundary.

17 Claims, 3 Drawing Figures

APPARATUS FOR MOVING AN OBJECT IN AN ISOLATED ENVIRONMENT

BACKGROUND OF THE INVENTION

The present invention is related to an apparatus for moving an object in an environment that is isolated from the ambient environment, and more particularly to a facility for vibrating a prototype tube for a nuclear power plant steam generator while the tube is being tested for corrosion under severe pressure, thermal, and chemical conditions in a test vessel.

A typical pressurized water reactor includes, inter alia, a reactor vessel which contains nuclear fuel, a coolant such as pressurized water which is heated by the nuclear fuel, and means for monitoring and controlling the nuclear reaction. The water heated in the reactor vessel is conveyed from and returned to the vessel by a reactor coolant system which includes one or more reactor coolant loops, each loop including a steam generator through which the water is pumped before it is returned to the reactor vessel for re-heating. The steam generator is basically a heat exchanger which transfers heat from the reactor coolant system to water from a secondary source that is isolated from the water of the reactor coolant system; the transferred heat boils the water from the secondary source, and the resulting steam is conveyed to a turbine to generate electricity.

A typical steam generator includes a vessel for receiving water from the secondary source and a large number of vertically arranged hair-pin tubes for conveying water from the reactor coolant system. Typically these tubes are made of Inconel (a nickel alloy) and have outer diameters of ⅞ inch (2.2 cm). The hair-pin tubes have hair-pin portions that are oriented toward the top of the steam generator and have elongated straight portions that are bundled together by support plates which are disposed parallel to one another at spaced apart positions. The support plates have openings for passage of the tubes and openings for passage of bubbles from the boiling secondary water.

Although the water from the reactor coolant system (that is, the water flowing within the tubes of the steam generator) is quite pure, contaminants may be present in the water from the secondary source. These contaminants may cause corrosion, a problem which is particularly troublesome at the openings where the tubes pass through the support plates. Corrosion products may accumulate in the gap or crevice between a tube and an opening, causing stress which may lead to cracking of the tube. Such cracks are to be scrupulously avoided because, inter alia, they might permit water from the reactor coolant system to mix with the secondary water and cause environmental pollution.

A conventional facility for testing a straight portion of a prototype steam generator tube includes an elongated vessel which is partially filled with water having the impurities of interest, such as chlorides, sulfates, iron oxide sludge, copper, substances of various pH values, etc. The vessel has a bottom closure member through which passes the tube to be tested, the axis of the tube lying along the axis of the vessel. Within the vessel, the tube under test is closed at its upper end, and a plate having an opening through which the tube passes is wired to the tube in order to simulate a support plate. A narrow inner tube is inserted into the tube under test, the upper end of the inner tube having an opening positioned near the closure of the tube under test. Outside the vessel, fittings are connected to the tube under test and to the inner tube. To conduct the test, pressurized water at approximately 600° F. (315° C.) is injected via one fitting, flows upward into the test vessel between the walls of the tube under test and the inner tube, and flows out the other fitting through the inner tube. This flow of hot water causes boiling within the vessel, raising the pressure in the vessel to around 900 pounds per square inch ($6.2 \times 10^7$ dynes/cm$^2$) and raising the temperature to a correspondingly high value (typically around 500° F., or 260° C.). After the elapse of a suitable period of time, determined by the test protocol, the vessel is disassembled and the tube under test is checked.

While the conventional apparatus described above simulates a steam generator in that it permits a prototype tube to be tested at high temperature and pressure while heat flows through the walls of the tube, an important physical activity which occurs within a steam generator is ignored. Vibration is present in an actual steam generator due to vigorous boiling and turbulent fluid flow. Vibrations from around 15 to around 40 Hz have been observed within steam generators, and it is not entirely clear how such vibrations influence corrosion, particularly at the openings in the support plates.

SUMMARY OF THE INVENTION

Accordingly, an object of the present invention is to provide an apparatus for moving an object, such as a steam generator tube, in an isolated environment, such as a high temperature, high pressure environment.

Another object of the present invention is to improve the conventional apparatus for testing steam generator tubes by vibrating the tube as it is being tested.

Another object of the present invention is to provide a test facility wherein vibration is conveyed into a pressurized vessel, from a shaker located outside of the pressurized vessel, without a shaft or other element which extends through the pressure boundary, since a shaft seal for containing the pressure would be subjected to severe conditions and might fail.

These and other objects are attained by providing a test vessel having an opening through which extends a lever arm having one end which is connected to an element that is driven by a shaker. A flex tube is disposed around the outer portion of the lever arm, and is sealingly connected to the element and to the pressure vessel to provide a pressure boundary. The end of the lever arm that is disposed within the test vessel is connected to the tube under test by a vibration-coupler. Between the two ends of the lever arm, a fulcrum-former operationally connects the vessel and the lever arm to provide a pivot point. Driven by the shaker, the lever arm undergoes small oscillations about the pivot point provided by the fulcrum-former and thus vibrates the tube under test, while the flex tube contains the pressure.

DESCRIPTION OF THE PREFERRED EMBODIMENTS

Figure 1:
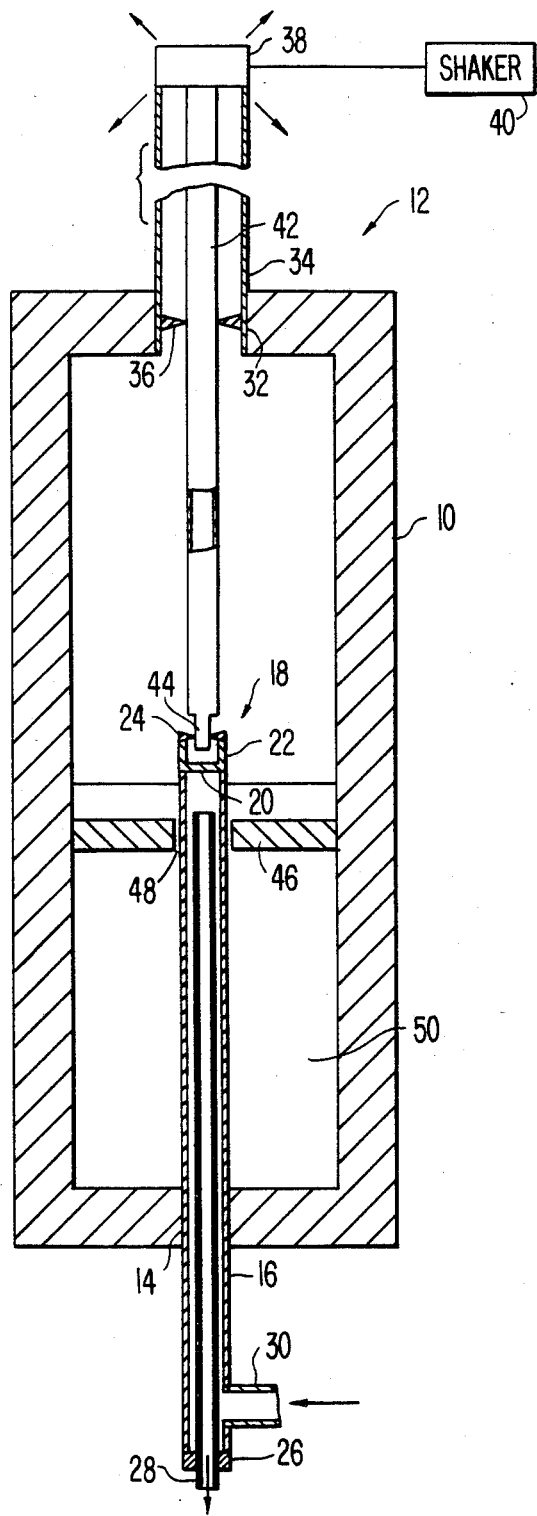
FIG. 1 is a view, partially in axial section, schematically illustrating an embodiment of the present invention.

In FIG. 1 the test vessel 10 of an apparatus configured as a test facility 12 is illustrated as a unitary member, although it will be apparent that vessel 10 would be composed of separate members in practice so that it can be assembled and disassembled. The bottom end of vessel 10 has an opening 14 through which extends prototype steam generator tube 16, tube 16 being welded at opening 14 to provide a seal. Cup element 18 has a base portion 20 which is welded to the upper end of tube 16, thereby sealing tube 16, and wall portions 22 to which a tungsten carbide washer-shaped element 24 is affixed. A fitting 26 connected at the lower end of tube 16 sealingly engages inner tube 28, which extends through tube 16 and which has an upper end located in the vicinity of cup element 18. Tube 30 is connected to tube 16. Tube 30 receives hot water which is circulated upward between the walls of tubes 16 and 28 and then downward through tube 28. This flow may, of course, be reversed.

With continuing reference to FIG. 1, the upper end of vessel 10 has an opening 32 at which the lower end of flex tube 34 is welded. A fulcrum-forming member such as tungstem carbide washer-shaped element 36 is operationally connected to vessel 10 by being affixed to the inner wall of tube 34. The upper end of tube 34 is closed by a plug element 38, which is driven by orthogonal shaker 40. The term "orthogonal" here means that shaker 40 is able to vibrate element 38 along a line lying in the plane of FIG. 1 and along a line that is perpendicular to the plane of FIG. 1. Thus element 38 can be vibrated in all directions, not just back and forth.

With continuing reference to FIG. 1, the upper end of lever arm 42 is affixed to plug element 38 and the lower end has a narrowed portion 44 which extends through washer-shaped element 24, so that element 24 and cup element 18 form a vibration-coupler which connects lever arm 42 to tube 16. A simulated support plate 46 is affixed to the inner walls of vessel 10 and has an opening through which tube 16 extends, leaving crevice 48. Crevice 48 is exaggerated for purposes of illustration in FIG. 1; the opening through which tube 16 extends generally has a diameter tnhat is on the order of only 0.023 inch (0.058 cm) greater than the diameter of tube 16, or less.

In preparation for a test, water 50 having the desired contaminants is introduced into test vessel 10. Pressurized water at 600° F. (315° C.) is introduced through tube 30 and flows out through the lower end of tube 28, thereby boiling water 50 and raising the pressure within vessel 10 until equilibrium is reached, at approximately 900 pounds per square inch ($6.2 \times 10^7$ dynes/cm$^2$). Welded seals at openings 14 and 32 and at plug element 38 prevent leaks. A shaft seal is not needed because the upper portion of arm 42 is enclosed by flex tube 34. Shaker 40 drives plug 38, which in turn moves the upper end of arm 42 while tube 34 flexes. Arm 42 pivots about the fulcrum formed by wather-shaped element 36 and the resulting vibrations are conveyed via the coupler provided by cup element 18 and washer-shaped element 24 to the upper end of tube 16. Shaker 40 is controlled to obtain the frequency, direction, and amplitude of the vibrations desired at crevice 48.

Due to the severe temperature, chemical, and pressure conditions within vessel 10, washer-shaped elements 36 and 24, and the adjacent surfaces of lever arm 42, may wear at an excessive rate. In order to reduce wear the embodiment of FIG. 2 avoids frictional engagement at the fulcrum-former and the vibration-coupler.

Figure 2:
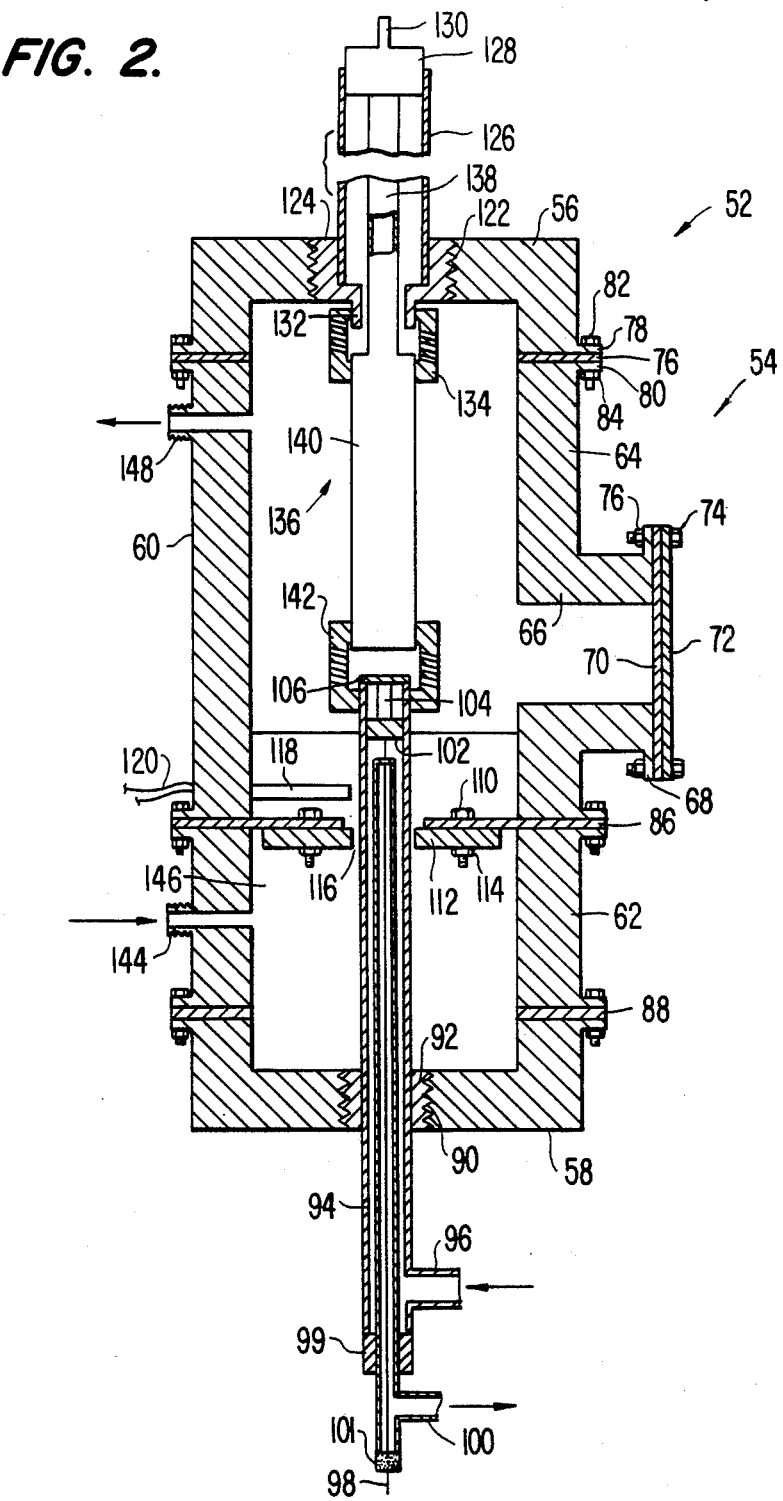
FIG. 2 is a view, partially in axial section, illustrating a practical embodiment of the present invention.

In FIG. 2, test facility 52 includes a test vessel 54 having a removable upper end cap 56, a removable lower end cap 58 and a body portion 60 provided by pipe segment 62 and a "T-connector" pipe segment 64. Segment 64 has a pipe arm 66 which terminates in flanges 68. A seal 70 and plate 72 are removably attached to arm 66 by bolts 74 and nuts 76. Seal 76 is positioned between end cap 56 and segment 64, which have flanges 78 and 80 respectively that are clamped by bolts 82 and nuts 84. Similarly, blind seal 86 is bolted between pipe segments 62 and 64 and seal 88 is bolted between end cap 58 and pipe segment 62. Although FIG. 2 illustrates flanges for connecting the end caps and pipe segments of test vessel 54, it may be convenient to employ Graylock connectors, available from Gray Tool Company, 7135 Ardmore Street, Houston, Tex. 77001, instead.

With continuing reference to FIG. 2, a threaded opening 90 in end cap 58 receives a fitting 92 to which prototype steam generator tube 94 is welded. A tube 96 is attached to tube 94 to supply hot water thereto. An inner tube 98 extends through tube 94 and fitting 99, which plugs the lower end of tube 94 with respect to tube 98. Tube 100 is connected to tube 98, which is closed by packing gland 101. Hot water received from tube 96 flows upward between the walls of tubes 94 and 98 and then downward through tube 98 (or vice versa). A plug 102 is welded near the upper end of tube 94, and an accelerometer 104 is mounted between plug 102 and a cap 106 welded at the upper end of tube 94. Leads 108 from accelerometer 104 (only one of which is illustrated in FIG. 2) extend through plug 102, the interior of tube 98, and packing gland 101 to provide signals for instrumentation.

Blind seal 86 is bored to provide a central opening, through which tube 94 passes, and bores (not illustrated) for cap screws 110. Screws 110 extend through matching bores (not illustrated) in a plate 112 simulating a steam generator support plate, which is secured to seal 86 by nuts 114. Plate 112 is ⅞ inch (1.76 cm) thick and its central opening has a diameter that is 0.023 inch (0.058 cm) larger than the ⅞ inch (2.2 cm) outer diameter of tube 94 to provide a crevice 116. The central opening of plate 112 must be very precisely located along the axis of test vessel 54, and for this purpose it may be desirable to provide locating pins (not illustrated) through bores (not illustrated) passing through seal 86 and plate 112.

If desired an additional simulated steam generator support plate may be clamped to the upper surface of seal 86 in order to provide additional test data. A position sensor 118 is mounted to pipe segment 64 at a position close to the central opening in plate 112. The leads 120 from sensor 118 provide signals for instrumentation, not illustrated. An additional position sensor (not illustrated) is mounted 90° from sensor 118, so that the two sensors together provide signals indicating the instantaneous position of tube 94 in a plane that is close to plate 112. The signals from accelerometer 104 can be compared with the instantaneous position provided by the position sensors in order to provide a check, and moreover accelerometer 104 detects collisions between tube 94 and plate 112. If desired, force sensors or other transducers may also be mounted adjacent crevice 116 or within tube 94.

With continuing reference to FIG. 2, cap 56 is provided with a threaded opening 122 which receives fitting 124. The lower end of flex tube 126 is welded to fitting 124 and the upper end is welded to a plug element 128 having a central post 130 for attachment to a shaker, which will be described subsequently. Fitting 124 is provided with a cylindrical projection 132 serving as an anchor for attachment of a fulcrum-former, here helical coupler 134. Helical coupler 134, which is illustrated schematically in FIG. 2, resembles a spring formed by a thick-wall pipe having a helical cut through it. The spring-type configuration of a helical coupler permits it to act as a frictionless universal joint. Suitable helical couplers are known and are commercially available, for example, from Helical Products Co., Inc., Santa Maria, Calif., under model number TS 2078-28-28.

It is desirable for lever arm 136 to be as stiff as possible, in order to transmit vibration efficiently. The physical dimensions of fitting 124 and flex tube 126 impose constraints on the outer diameter of upper portion 138 of arm 136, but the diameter of lower portion 140 can be increased for added stiffness. Upper portion 138 may be made of a very stiff substance, such as a tungsten or molybdenum alloy, in order to increase its stiffness. The upper end of portion 138 is fixedly attached to plug element 128; the upper end of portion 140 is fixedly attached to coupler 134; and the lower end of portion 140 is attached to the upper end of a vibration-coupler provided by helical coupler 142, the lower end of which is removably clamped to the upper end of tube 94.

Fitting 144 in pipe segment 62 permits water 146 having the desired contaminants to be introduced into test vessel 54, and fitting 148 permits steam to be removed. During a test the removed steam can be condensed and re-introduced via fitting 144 in order to control the pressure and temperature within vessel 54. Additional fittings at various positions may be added to vessel 54 in order to provide drainage after completion of the test, to control water level within vessel 54, etc.

Figure 3:
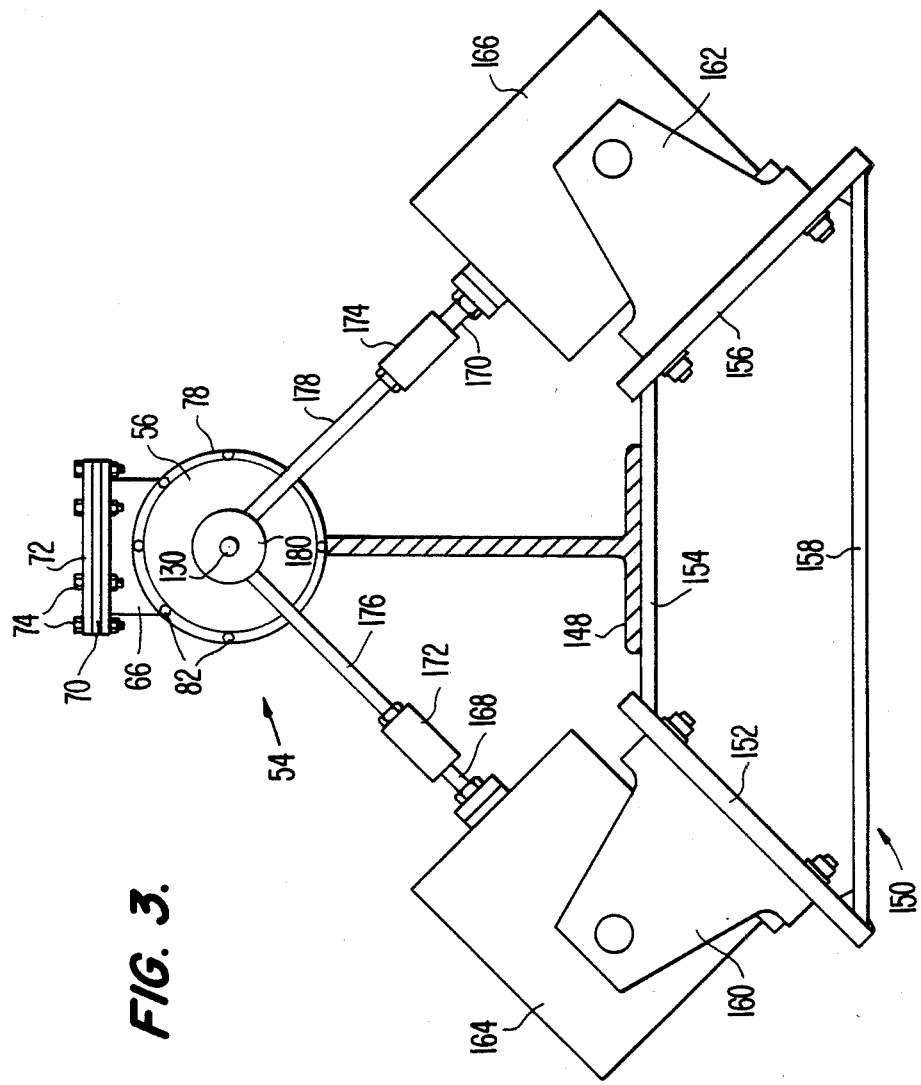
FIG. 3 is a top plan view of a shaker connected to the embodiment of FIG. 2.

With reference next to FIGS. 2 and 3, facility 52 is preferably mounted on an I-beam support 148, which is fixed to the floor (not illustrated) and beams (not illustrated) in the ceiling of the test laboratory, by mounting body portion 60 of vessel 54 to support 148. End caps 56 and 58 and pipe segment are not permanently affixed to support 148, so that they can be removed. An orthogonal shaker 150 is also mounted on support 148 at a position to engage post 130 of plug element 128. Shaker 150 includes a mount provided by plates 152, 154, 156, and 158, which are welded together in a trapezoidal configuration with plate 152 being positioned at right angles to plate 156. Plate 154 is welded to support 148. Brackets 160 and 162 are bolted to plates 152 and 156, respectively, and shaking mechanisms 164 and 166 are mounted on brackets 160 and 162, respectively. Mechanisms 164 and 166 are able to provide vibrations throughout at least the 15-40 Hz range which has been observed within steam generators, and preferably considerably beyond both the upper and lower ends of this range. The frequencies and amplitudes of shaking mechanisms 164 and 166 can be independently adjusted to provide the vibration pattern or mode desired in a particular test. For example shaker 150 can be set to wipe tube 94 around the periphery of the opening in plate 112, to move tube 194 in a zig-zag path which bangs the tube against the periphery of the opening in plate 112, to move tube 94 in a predetermined manner which does not bring the tube into contact with plate 112, etc. Suitable devices for shaking members 164 and 166 are known and are commercially available, for example, from LTV Ling Altec Ltd, Royston Herts, England, under model number 408. The precise vibration pattern of tube 94 and the intensity of any impacts are monitored by position sensors 118 and accelerometer 104, and shaking mechanisms 164 and 166 are controlled electronically to provide the movement desired in a particular test.

With continuing reference to FIG. 3, the shafts 168 and 170 of shakers 164 and 166 are connected by couplers 172 and 174 to shafts 176 and 178. Couplers 172 and 174 transfer linear movement but are somewhat flexible, permitting shafts 176 and 178 to move angularly with respect to shafts 168 and 170, respectively. The outer ends of shafts 176 and 178 are attached to respective collars 180, only the upper one of which is shown in FIG. 3. Collars 180 are stacked on post 130 and are rotatable with respect thereto.

Referring next to both FIGS. 2 and 3, a typical test will now be described. A tube 94 which is to be tested is welded to a fitting 92, and collateral elements 96-108 are assembled on tube 94. Lower end cap 58 is removed from vessel 54 and fitting 92 is screwed into the bottom thereof. If a new plate 112 is to be used in the test, pipe segment 62 is also removed and the plate 112 is attached to seal 86; segment 62 is then re-attached to segment 64. With plate 72 and seal 70 removed from arm 66 to provide manual access to coupler 142, end cap 58 is installed as tube 94 is threaded through the opening in plate 112 and guided into the lower end of coupler 142. It will be apparent that end cap 56 can also be removed, if desired. Seal 70 and plate 72 are installed to complete the reassembly of test vessel 54, and water 146 having the desired contaminants is introduced into test vessel 54 to a depth which covers plate 112. Thereafter pressurized hot water is circulated through tube 94 in the manner previously discussed, and shaker 150 is activated at the desired frequency and amplitude to shake plug 128. With coupler 134 forming a fulcrum about which arm 136 pivots, vibrations are transferred from the lower end of arm 140 to the upper end of tube 94 via coupler 142. Tube 126 flexes as arm 136 is shaken and provides a pressure boundary. Although not illustrated it is desirable to mount a guard pipe coaxially around flex tube 126, the lower end of the guard pipe being bolted to end cap 56 and the upper end of the pipe being positioned adjacent plug 128 and being left open to direct steam away from laboratory personnel in the event that tube 126 ruptures during a test. For added safety a contact switch (not illustrated) may be mounted around the periphery of the upper end of the guard pipe in order to turn shaker 150 OFF in the event that the displacement of plug 128, in any direction, exceeds a predetermined value.

The dimensions of the components illustrated in FIG. 2 are distorted to facilitate illustration. In a typical facility for testing steam generator pipes 94 of ⅞ inch (2.2 cm) outer diameter, flex tube 126 is an Inconel tube having a length of about 24 inches (61 cm), an outer diameter of ¾ inches (1.9 cm), and a wall thickness of 0.043 inches (0.109 cm). Upper portion 138 of lever arm 136 has a length of about 29 inches (74 cm) and an outer diameter of ½ inch (1.27 cm). Lower portion 140 has a length of about 17 inches (43 cm) and an outer diameter of ⅞ inches (2.2 cm). Test vessel 54 has an outer diameter of 4.5 inches (11.4 cm) and a total height of about 73 inches (185 cm). The length of the portion of tube 94 that is within test vessel 54 is about 53 inches (135 cm).

It will be understood that the above description of the present invention is susceptible to the various modifications, changes, and adaptations, and the same are intended to be comprehended within the meaning and range of equivalents of the appended claims. For example the invention may be used to shake potentially dangerous biological samples, to move an ion beam generator in a vacuum chamber, to mount a moving anode for an X-ray tube, etc.

I claim:

1. An apparatus for moving an object in an isolated environment, comprising:
    a vessel having an interior which is exposed to said isolated environment and having an opening to said interior, at least a portion of said object being disposed inside said vessel;
    a lever arm which extends through said opening in said vessel, said lever arm having a first elongated portion, a second elongated portion, and an intermediate portion between said first and second portions, said first portion being disposed outside said vessel and said second portion being disposed inside said vessel;
    means operationally connecting said vessel and said lever arm for forming a fulcrum at said intermediate portion of said lever arm;
    means disposed outside said vessel for moving said first portion of said lever arm to pivot said lever arm about said fulcrum;
    means for coupling said second portion of said lever arm to said object to move said object when said lever arm is pivoted;
    an elongated hollow member surrounding said first portion of said lever arm, said hollow member having a first end which is sealingly connected to said vessel and a second end which is spaced apart from said vessel, the interior of said vessel communicating with the interior of said hollow member through said opening of said vessel; and
    means for sealing said second end of said hollow member to said lever arm.

2. The apparatus of claim 1, wherein said means for forming a fulcrum comprises an annular element through which said lever arm passes.

3. The apparatus of claim 2, wherein said means for coupling comprises another annular element mounted on said object, said lever arm engaging said another annular element.

4. The apparatus of claim 1, wherein said means for forming a fulcrum comprises a helical coupler having an end which is attached to said lever arm and having another end which is operationally connected to said vessel.

5. The apparatus of claim 4, wherein said means for coupling comprises another helical coupler to join said lever arm to said object.

6. The apparatus of claim 1, wherein said elongated hollow member comprises a cylindrical tube.

7. The apparatus of claim 1, wherein said object is a steam generator tube which is to be tested, and further comprising a plate having an opening therein, means for mounting said plate inside said vessel with said steam generator tube extending through said opening in said plate, and means for increasing the pressure and temperature inside said vessel above the ambient pressure and temperature.

8. The apparatus of claim 7, wherein said vessel is partially filled with water, and wherein said means for increasing the pressure and temperature comprises plug means disposed between said lever arm and said plate for sealing said steam generator tube from said interior of said vessel, an inner tube which is inserted inside said steam generator tube and which has an open end disposed adjacent said plug means, and means for receiving hot fluid between said steam generator tube and said inner tube, said hot fluid flowing toward said plug means to transfer heat to the water in said vessel through said steam generator tube and then being drained through said inner tube.

9. The apparatus of claim 8, further comprising an accelerometer mounted in said steam generator tube, said accelerometer having at least one lead which extends through said inner tube.

10. The apparatus of claim 7, wherein said vessel comprises lower and upper pipe segments, and wherein said means for mounting said plate inside said vessel comprises a seal between said lower and upper pipe segments, and means for connecting said plate to said seal.

11. The apparatus of claim 10, wherein said vessel further comprises a lower end cap removably connected to said lower pipe segment, said steam generator tube being mounted on said lower end cap, and an upper end cap removably connected to said upper pipe segment, said opening of said vessel being disposed in said upper end cap.

12. The apparatus of claim 11, wherein said elongated hollow member comprises a flex tube connected to said upper end cap, and wherein said means for sealing said second end of said hollow member comprises another plug element connecting said lever arm and said flex tube.

13. The apparatus of claim 13, wherein said means for moving said first portion of said lever arm comprises a shaker operationally connected to said another plug element.

14. The apparatus of claim 13, wherein said shaker comprises a pair of shaking mechanisms mounted at right angles to one another.

15. The apparatus of claim 11, wherein said means for forming a fulcrum comprises an annular element through which said lever arm passes, said annular element being operationally mounted on said upper end cap, wherein said means for coupling comprises another annular element, said another annular element being operationally mounted on said steam generator tube and engaging said lever arm, and wherein said upper pipe segment comprises a T-section permitting manual access to said another annular element.

16. The apparatus of claim 13, wherein said means for forming a fulcrum comprising a helical coupler having an end which is attached to said lever and having another end which is operationally mounted on said upper end cap, wherein said means for coupling comprises another helical coupler to join said lever arm to said steam generator tube, and wherein said upper pipe segment comprises a T-section permitting manual access to said another helical coupler.

17. The apparatus of claim 7, further comprising at least one position sensor mounted in said vessel adjacent said steam generator tube.

* * * * *